United States Patent [19]

Vasta

[11] 4,307,000

[45] Dec. 22, 1981

[54] ALIPHATIC POLYURETHANE COATING COMPOSITION

[75] Inventor: Joseph A. Vasta, Wilmington, Del.

[73] Assignee: E. I. Du Pont de Nemours and Company, Wilmington, Del.

[21] Appl. No.: 211,585

[22] Filed: Dec. 1, 1980

[51] Int. Cl.³ .............................................. C08L 91/00
[52] U.S. Cl. ...................... 260/18 TN; 260/33.6 UB; 260/45.85 A; 528/81; 528/56; 428/423.1; 428/424.2; 428/424.7; 428/424.8
[58] Field of Search .................. 260/33.6 UB, 18 TN, 260/45.85 A; 528/81, 56; 428/423.1, 424.2, 424.7, 424.8

[56] References Cited

U.S. PATENT DOCUMENTS 3,177,167  4/1965  Skreckoski et al. .................. 260/18
3,244,673  4/1966  Bruin et al. ............................ 260/76
3,346,524  10/1967  Skreckoski .......................... 260/22

*Primary Examiner*—Joseph L. Schofer
*Assistant Examiner*—Bernard Lipman
*Attorney, Agent, or Firm*—Hilmar L. Fricke

[57] ABSTRACT

A coating composition of an aliphatic polyurethane resin in an organic solvent; wherein the resin has terminal hydroxyl groups, a weight average molecular weight of about 3,000 to 30,000, and is the reaction product of a fatty acid ester of drying oil fatty acids, polyol, having at least three reactive hydroxyl groups, aromatic monobasic and an alkyl amino aromatic acid that provides ultraviolet light absorbing groups, and an aliphatic diisocyanate; the composition can contain conventional pigments, organo metallic driers, and light stabilizers and cures at ambient temperatures and is useful as primary finish for metals, plastics and reinforced plastics, and can be used as a refinish composition for automobiles and trucks.

21 Claims, No Drawings

ALIPHATIC POLYURETHANE COATING COMPOSITION

BACKGROUND OF THE INVENTION

1. Field of the Invention

This invention relates to coating composition, in particular to polyurethane coating composition.

2. Description of the Prior Art

Ambient temperature curing compositions of a mixture of an acrylic and alkyd resin are shown in Miller and Walus, U.S. Pat. No. 3,585,160 issued June 15, 1971. An improvement to this composition that uses a polyisocyanate and catalyst is shown in Miller, U.S. Pat. No. 3,844,993 issued Oct. 29, 1974. Thermosetting coating compositions of an alkyd resin and an aliphatic polyisocyanate crosslinking agent are shown in Miller, U.S. Pat. No. 3,789,037 issued Jan. 29, 1974.

While the above compositions provide adequate finishes, none provide an isocyanate free polyurethane coating composition that forms a finish that cures at ambient temperatures that is useful for automobiles and trucks and is weatherable for a long term.

SUMMARY OF THE INVENTION

A coating composition containing about 30–90% by weight, based on the weight of the composition, of an organic solvent and 10–70% by weight, based on the weight of the composition, of a binder; wherein the binder comprises an aliphatic polyurethane resin having terminal hydroxyl groups and a weight average molecular weight of about 3,000 to 30,000 determined by a gel permeation chromatography and is the reaction product of (1) a fatty acid ester of drying oil fatty acids, polyol having at least three reactive hydroxyl groups, aromatic monobasic acid and alkyl amino aromatic acid that provides ultraviolet light absorbing groups and (2) an aliphatic diisocyanate.

DETAILED DESCRIPTION OF THE INVENTION

The coating composition of this invention dries and cures at ambient temperatures to a durable and weatherable finish useful as an exterior finish for automobiles and trucks. The composition also is useful for repairing finishes of automobiles and trucks.

The binder of the coating composition is an aliphatic polyurethane resin which is formed by reacting a fatty acid ester containing ultraviolet light absorbing groups and drying oil constituents with aliphatic diisocyanate. Sufficient fatty acid ester is used to react with all of the isocyanate groups of aliphatic diisocyanate to form an isocyanate free polyurethane resin with terminal hydroxyl groups.

The presence of drying oil constituents in the resin provide a coating composition that will cure by oxidative drying reaction at ambient temperatures to provide a hard glossy and durable finish. Also, the presence of ultraviolet light absorbing groups in the resin substantially improves the weatherability of a finish.

The polyurethane resin is prepared by first forming a fatty acid ester by either a conventional fusion process or a solution process using conventional equipment. Drying oil fatty acids, polyol, aromatic monobasic acid and alkyl amino aromatic acid are reacted at a temperature of about 160°–250° C. for about 2–8 hours. The resulting fatty acid ester has a hydroxyl number of about 200 to 350. The fatty acid ester then is reacted with an aliphatic diisocyanate in the presence of a catalyst for about 0.5 to 3 hours at a temperature of about 30°–100° C. to form a polyurethane resin having a weight average molecular weight of about 3,000 to 30,000.

Molecular weights referred to herein are determined by gel permeation chromatography using polymethylmethacrylate as a standard.

Typical solvents that do not contain reactive hydrogen groups that can be used in the solution process for making the fatty acid esters are as follows: toluene, xylene, ketones such as methyl ethyl ketone, methyl isobutyl ketone, acetone and the like; ethylene glycol monoalkyl ether acetates, such as ethylene glycol monoethyl ether acetate, and the like.

Typical drying oil fatty acids that are used to prepare the fatty acid ester are as follows: dehydrated castor oil fatty acids, soya oil fatty acids, tung oil fatty acids, linseed oil fatty acids, oiticica oil fatty acids, safflower oil fatty acids, and the like. Dehydrated castor oil fatty acids are preferred.

Typical polyols that can be used to prepare the fatty acid ester are as follows: glycerol, trimethylol alkanes, such as trimethylolethane, trimethylolpropane, and the like, pentaerythritol, methylglycoside, dipentaerythritol, and sorbitol. Trimethylol propane is preferred.

Typical monobasic organic acids that are used to prepare the fatty acid ester are as follows: abietic acid, benzoic acid and, p-tert-butylbenzoic acid.

Typical alkyl amino aromatic acids that provide ultraviolet light absorbing groups that are used to form the fatty acid ester are as follows: p-dimethyl aminobenzoic acid, and p-aminobenzoic acid.

One particularly preferred fatty acid ester that forms a high quality composition is the esterification product of dehydrated castor oil fatty acids/benzoic acid/trimethylol propane/dimethyl aminobenzoic acid and has a hydroxyl number of about 200 to 350.

Typical aliphatic diisocyanates that are used to form the polyurethane resin are as follows: propylene-1,2-diisocyanate, butylene-1,2-diisocyanate, butylene-1,3-diisocyanate, hexamethylene diisocyanate, octamethylene diisocyanate, nonamethylene diisocyanate, decamethylene diisocyanate, 2,11-diisocyanate-dodecane and the like; 2,2'-methylene-bis(cyclohexyl isocyanate), 3,3'-methylene-bis(cyclohexyl isocyanate), 4,4'-methylene-bis(cyclohexyl isocyanate), 4,4'-ethylene-bis(cyclohexyl isocyanate), 4,4'-ethylene-bis-(cyclohexyl isocyanate), 4,4'-propylene-bis-(cyclohexyl isocyanate), bis-(para-isocyano-cyclohexyl) sulfide, bis(para-isocyano-cyclohexyl) sulfone, bis-(para-isocyanocyclohexyl)ether, bis-(para-isocyano-cyclohexyl) diethyl silane, bis-(para-isocyano-cyclohexyl) diphenyl silane, bis-(para-isocyano-cyclohexyl) ethyl phosphine oxide, bis-(para-isocyano-cyclohexyl) phenyl phosphine oxide, bis-(para-isocyano-cyclohexyl)N-phenyl amine, bis-(para-isocyano-cyclohexyl) N-methyl amine, 2,2-dimethyl propylene diisocyanate, 3-methoxy-hexamethylene diisocyanate, 2,5-dimethyl heptamethylene diisocyanate, 5-methyl-nonamethylene diisocyanate, 1,4-diisocyanocyclohexane, 1,2-diisocyano-octadecane, and the like.

One preferred aliphatic diisocyanate is 4,4'methylene bis (cyclohexyl isocyanate).

A metallic organo catalyst is used to form the polyurethane resin, usually about 0.001 to 0.2% by weight, based on the weight of the polyurethane resin is used. Typical catalysts are ferric acetyl acetonate, and dibutyl tin dilaurate. Ferric acetyl acetonate is preferred particularly in combination with a tertiary amine in a 3:1 molar ratio.

The polyurethane resin is formulated into a coating composition by the addition of any of the aforementioned solvents or other solvents. The composition can be clear or pigmented. Usually, organo metallic driers and light stabilizers are added to the coating composition.

Pigments are used in the coating composition in a pigment to binder weight ratio of about 0.5:100 to 75:100 and can be used up to 300:100. Typical pigments that can be used are as follows: titanium dioxide, aluminum flake, red, yellow or orange iron oxide, "Irgazin" yellow and green, copper phthalocyanine green and blue, "Monastral" red, extender pigments and a wide variety of other organic and inorganic pigments.

The coating composition can contain organo metallic driers in amounts of about 0.1-1% by weight, based on the weight of the binder. Typical metallic driers are based on cobalt, zirconium, calcium and the like and are cobalt naphthenate, calcium naphthenate, zirconium octoate, cobalt octoate, zinc octoate and the like.

One preferred combination of driers comprises cobalt naphthenate and calcium naphthenate.

The coating composition can contain light stabilizers in an amount of 0.1-5% by weight, based on the weight of the binder. Typically useful stabilizers are shown in Chang, U.S. Pat. No. 4,208,465 issued June 17, 1980 col. 2, line 53—col. 3, line 35 which disclosure is hereby incorporated by reference. Preferred stabilizers are substituted piperazines as disclosed in Ramey et al. U.S. Pat. No. 4,007,156 issued Feb. 8, 1977. One preferred stabilizer is di[4(2,2,6,6-tetramethylpiperidinyl)] sebacate.

About 1 to 20% by weight, based on the weight of the binder of an aminoplast crosslinking agent can be added such as melamine/formaldehyde resin, benzoquanamine resin, a urea/formaldehyde resin and the like. Compositions containing aminoplast resins usually require baking at elevated temperatures of about 100°-250° C. for about 10 minutes to 2 hours to fully crosslink the resulting finish.

One useful coating composition comprises about 30-90% by weight of solvent and 10-70% by weight of a binder of about
  (1) 94-99.8% by weight, based on the weight of the binder, of an aliphatic polyurethane resin, which is the reaction product of a fatty acid ester of dehydrated castor oil fatty acids, trimethylol propane, benzoic acid, para dimethylamino benzoic acid and methylene bis(cyclohexyl isocyanate) having a weight average molecular weight of about 10,000 to 20,000;
  (2) 0.1-5% by weight, based on the weight of the binder, of light stabilizer; and
  (3) 0.1-1% by weight, based on the weight of the binder, of an organo metallic drier and optionally, containing pigment in a pigment binder weight ratio of about 0.5/100 to 75/100.

The coating composition is pigmented for most uses. The pigments are formed into a mill base by grinding the pigment with the polyurethane resin or acrylic or other dispersing resin and the resulting mill base is added to form a pigmented composition. The mill base is prepared by conventional grinding techniques such as sand grinding, ball milling, attritor grinding and the like. The mill bases are then mixed with the polyurethane resin solution and other constituents mentioned above to form a coating composition.

To apply the coating composition, the composition is reduced to an application viscosity with any of the aforementioned solvents. The composition can be applied to a variety of substrates by any of the conventional application methods such as spraying, electrostatic spraying, dipping, brushing, flow coating, roller coating and the like. The resulting coatings can be dried at ambient temperatures or baked at relatively low temperatures up to about 140° C. for about 5 minutes to 2 hours. The resulting coating is about 0.1-5 mils thick and is glossy, durable, weatherable, and has an excellent appearance.

The composition has excellent adhesion to all types of substrates such as wood, glass and bare metal such as cold roll steel or treated metal such as phosphatized steel; also to metal painted with the following: acrylic enamel, acrylic lacquer, acrylic dispersion, acrylic dispersion lacquer, alkyd enamel, conventional alkyd or epoxy primers; and also to fiberglass reinforced with polyester painted as above; acrylonitrile/butadiene/styrene plastics or other plastics and reinforced plastic laminates painted as above. The aforementioned characteristics make the composition particularly useful as a finish or a refinish used for automobiles and truck bodies.

Another aspect of this invention is to utilize the composition as a clear coat/color coat finish for substrates. In this finish, a clear coat top layer is in firm adherence to a color coat layer that is in adherence with a substrate. The clear coat is a transparent film of the coating composition of this invention and the color coat is the coating composition of this invention containing pigments in the aforementioned pigment to binder ratio.

The following examples illustrate the invention. All parts and percentages are on a weight basis unless otherwise indicated. All weight average molecular weights are determined by gel permeation chromatography using polymethylmethacrylate as a standard.

EXAMPLE 1

A polyurethane resin composition is prepared by charging the following constituents into a polymerization vessel equipped with a reflux condenser, thermometer, nitrogen inlet and heating mantle:

|  | Grams |
|---|---|
| Portion 1 | |
| Trimethylol propane | 577.5 |
| Dehydrated castor oil fatty acids | 878.5 |
| Benzoic acid | 112.0 |
| p-Dimethylamino benzoic acid | 24.5 |
| Toluene | 87.5 |
| Portion 2 | |
| 4,4'Methylene bis(cyclohexyl isocyanate) | 731.5 |
| Portion 3 | |
| Ethylene glycol monoethyl ether acetate | 381.5 |
| Portion 4 | |
| Ferric acetyl acetonate | 1.4 |
| Toluene | 37.8 |
| Portion 5 | |
| Methanol | 30.0 |
| Toluene | 534.8 |
| Methyl ethyl ketone | 103.7 |

-continued

|  | Grams |
|---|---|
| Total | 3500.7 |

Portion 1 is charged into the polymerization vessel and heated to its reflux temperature under a blanket of nitrogen gas and water is removed during the reaction. The reaction is continued until an acid number of about 1.9 is reached and then the resulting composition is cooled to room temperature. Portion 2-4 are then added in sequence with thorough mixing after the addition of each portion. After an exothermic reaction subsides, the composition is heated to about 60° C. and held at this temperature until all of the isocyanate is reacted. Samples are periodically removed and checked by an infrared spectophotometer for isocyanate content. When there is no residual isocyanate, the reaction is complete. Portion 5 is added and the resulting composition is cooled to room temperature.

The resulting composition has a solids content of 66.4%, a Gardner Holdt viscosity measured at 25° C. of Y, a viscosity of 1,900 centistokes and the polyurethane resin has a weight average molecular weight of about 10,000–15,000. The polyurethane resin is the reaction product of a fatty acid ester of trimethylol propane/dehydrated castor oil fatty acids/benzoic acid/p-dimethylamino benzoic acid and 4,4'-methylene bis(cyclohexyl isocyanate). The polyurethane resin contains 0.7% by weight, based on the weight of the resin, of pendent ultraviolet light absorbing groups of p-dimethylamino benzoic acid.

A white enamel is prepared as follows:

|  | Grams |
|---|---|
| Portion 1 |  |
| Polyurethane resin composition (prepared above) | 491.000 |
| Toluene | 59.600 |
| Ethylene glycol monoethyl ether acetate | 6.500 |
| Portion 2 |  |
| Titanium dioxide pigment | 130.400 |
| Portion 3 |  |
| Ultraviolet light stabilizer (di[4(2,2,6,6-tetramethyl piperidinyl)] sebacate | 3.26 |
| Methyl ethyl ketoxime | 0.326 |
| Portion 4 |  |
| 6% Cobalt naphthenate drier solution in petroleum naphtha solvent | 5.400 |
| 10% Calcium napththenate drier solution in petroleum naphtha solvent | 1.630 |
| Total | 698.116 |

Portion 1 is charged into a mixing vessel and thoroughly mixed. Portion 2 is added and mixed with Portion 1. Portion 3 is added and the resulting composition is charged into a pebble mill and ground to zero fineness and then Portion 4 is added and ground for another hour and then strained through a sieve and stored for 24 hours in a container before spraying.

The resulting paint is then reduced to a spray viscosity with a solvent blend of toluene and methyl ethyl ketone in an 85/15 weight ratio. Phosphate treated cold roll steel panels primed with an epoxy resin primer are sprayed with the reduced paint. The resulting paint film on the panels is dried at ambient temperature for 24 hours to provide a film about 2.4 mils thick, having a gloss measured at 20° of 83.4, a gloss measured at 60° of 91.8, a distinctness of image of 100 and a hardness after 21 days of 1.56 knoops.

The above panels are exposed to weathering in Florida for 9 months and compared to a white commercial acrylic alkyd resin based paint coated on identical panels. Both paints had an acceptable performance under these weathering conditions and panels could be polished with a conventional auto wax to provide gloss and appearance which approximated original gloss and appearance.

EXAMPLE 2

A polyurethane resin composition is prepared by charging the following constituents into a polymerization vessel equipped as in Example 1:

|  | Grams |
|---|---|
| Portion 1 |  |
| Trimethylol propane | 576 |
| Dehydrated castor oil fatty acids | 879 |
| Benzoic Acid | 125 |
| p-Dimethylamino benzoic acid | 12 |
| Toluene | 88 |
| Portion 2 |  |
| 4,4'-Methylene bis(cyclohexyl isocyanate) | 731.5 |
| Portion 3 |  |
| Ethylene glycol mono ethyl ether acetate | 381.5 |
| Portion 4 |  |
| Ferric acetyl acetonate | 1.4 |
| Toluene | 37.8 |
| Portion 5 |  |
| Toluene | 534.8 |
| Methyl ethyl ketone | 133.7 |
| Total | 3404.7 |

Portion 1 is charged into the polymerization vessel and heated to its reflux temperature under a blanket of nitrogen gas and water is removed during the reaction. The reaction is continued until an acid number of less than 3 is reached and then the resulting composition is cooled to room temperature. Portions 2-4 are then added in sequence with thorough mixing after the addition of each portion. After an exothermic reaction subsides, the composition is heated to about 60° C. and held at this temperature until all of the isocyanate is reacted. Samples are periodically removed and checked by an infrared spectrophotometer for isocyanate content. When there is no residual isocyanate, the reaction is complete. Portion 5 is added and the resulting composition is cooled to room temperature.

The resulting composition has a solids content of 66.8%, a Gardner Holdt Viscosity measured at 25° C. of Z-3, viscosity of 3800 centistokes and the resin has a weight average molecular weight of about 20,000.

Polyurethane resin is the reaction product of a fatty acid ester of trimethylol propane/dehydrated castor oil fatty acids/benzoic acid/p-dimethylamino benzoic acid and 4,4'-methylene bis(cyclohexyl isocyanate). The resin contains about 0.35% by weight of p-dimethylamino benzoic acid ultraviolet light absorber.

A white enamel is prepared as follows:

|  | Grams |
|---|---|
| Portion 1 |  |
| Polyurethane resin composition (prepared above) | 490.000 |

-continued

|  | Grams |
|---|---|
| Toluene | 54.800 |
| Ethylene glycol monoethyl ether acetate | 6.500 |
| Portion 2 | |
| Titanium dioxide pigment | 130.800 |
| Portion 3 | |
| Ultraviolet light stabilizer (described in Example 1) | 3.260 |
| Methyl ethyl ketoxime | 0.326 |
| Portion 4 | |
| Cobalt naphthenate drier solution (described in Example 1) | 5.400 |
| Calcium naphthenate drier solution (described in Example 1) | 1.630 |
| Total | 692.716 |

The above constituents are mixed together and ground in a pebble mill following the procedure of Example 1 to form a paint.

The paint is reduced to a spray viscosity and applied to phosphate treated cold roll steel panels as in Example 1. The resulting dried paint film is about 2.4 mils thick, has a gloss measured at 20° of 87.0, a gloss measured at 60° of 92.5, a distinctness of image of 100 and a hardness after 21 days of 1.26 knoops.

Paint panels are exposed to weathering in Florida for 9 months and gave acceptable results that were very similar to the panels of Example 1.

I claim:

1. A coating composition comprising 30-90% by weight, based on the weight of the composition, of an organic solvent and 10-70% by weight, based on the weight of the composition, of a binder; wherein the binder comprises
    an aliphatic polyurethane resin having terminal hydroxyl groups and a weight average molecular weight of about 3,000 to 30,000 determined by gel permeation chromatography and consists of a condensation polymerization product of
    (1) a fatty acid ester consisting of the esterification product of drying oil fatty acids a polyol having at least three reactive hydroxyl groups an, aromatic monobasic acid, and an alkyl amino aromatic acid that provides ultraviolet light absorbing groups with
    (2) an aliphatic diisocyanate.

2. The coating composition of claim 1 containing pigment in a pigment to binder ratio of 0.5/100 to 300/100.

3. The coating composition of claim 1 containing 0.1-1% by weight, based on the weight of the binder, of organo metallic drier.

4. The coating composition of claim 1 containing 0.1-5% by weight, based on the weight of the binder, of light stabilizer.

5. The coating composition of claim 4 in which the light stabilizer is a substituted piperazine compound.

6. The coating composition of claim 1 containing 1-20% by weight, based on the weight of the binder, of a crosslinking agent.

7. The coating composition of claim 6 in which the crosslinking agent is an alkylated melamine formaldehyde resin.

8. The coating composition of claim 1 in which drying oil fatty acid is from the group of dehydrated castor oil fatty acids, soya oil fatty acids, tung oil fatty acids, linseed oil fatty acids, oiticica oil fatty acids and safflower oil fatty acids.

9. The coating composition of claim 1 in which the polyol is from the group of glycerol, trimethylol alkane, pentaerythritol dipentaerythritol and sorbitol.

10. The coating composition of claim 1 in which the aromatic monobasic acid is from the group of benzoic acid, butyl benzoic acid, and abietic acid.

11. The coating composition of claim 1 in which the alkyl amino aromatic acids is dimethyl amino benzoic acid or para amino benzoic acid.

12. The coating composition of claim 1 in which the aliphatic diisocyanate is selected from the group of alkylene diisocyanates having 2-12 carbon atoms in the alkylene group and alkylene bis(cyclohexyl isocyanates).

13. The coating composition of claim 1 in which the polyruethane resin consists of the condensation polymerization product of (1) a fatty acid ester consisting of the esterification product of trimethylol propane, dehydrated castor oil fatty acids, benzoic acid, and para dimethyl amino benzoic acid with (2) methylene bis(cyclohexyl isocyanate).

14. The coating composition of claim 12 containing about
    0.1-5% by weight based on the weight of the binder, of an ultraviolet light stabilizer consisting of a substituted piperazine compound;
    0.1-1% by weight, based on the weight of the binder of a blend of an organic cobalt drier and an organic calcium drier and
    pigment in a pigment to binder ratio of about 0.05/100 to 75/100.

15. A substrate coated with a layer of the dried coalesced composition of claim 1.

16. A metal substrate coated with a primer layer of pigmented alkyd resin and a layer of the dried coalesced composition of claim 14.

17. A reinforced plastic substrate coated with a primer layer and a layer of the dried coalesced composition of claim 2.

18. A process for making an aliphatic polyurethane which comprises the following steps:
    (1) contacting drying oil fatty acids, polyol having at least three reactive hydroxyl groups, aromatic monobasic acid and an alkyl amino aromatic acid at a temperature of 160°-250° C. for about 2-8 hours to form a fatty acid ester and
    (2) contacting said fatty acid ester with aliphatic diisocyanate in the presence of a metallic organo catalyst for about 0.5 to 3 hours at a temperature of about 30°-100° C. to form said resin having terminal hydroxyl groups and a weight average molecular weight of about 3,000 to 30,000 determined by gel permeation chromatography.

19. The process of claim 18 which comprises the use in Step (1) of trimethylol propane, dehydrated castor oil fatty acids, benzoic acid and dimethyl amino benzoic acid.

20. The process of claim 19 in which the aliphatic diisocyanate is methylene bis(cyclohexyl isocyanate).

21. The process of claim 20 in which the metallic organo catalyst is ferric acetyl acetonate.

* * * * *